United States Patent
Shelton et al.

[11] 3,720,742
[45] March 13, 1973

[54] WRAPPING OF BALED POLYMERS

[75] Inventors: Marcus H. Shelton, Baytown; Ralph James, Jr., Channelview, both of Tex.

[73] Assignee: Esso Research and Engineering Company, Linden, N.J.

[22] Filed: March 8, 1971

[21] Appl. No.: 122,071

[52] U.S. Cl. ............264/102, 264/112, 264/126, 264/300, 264/325
[51] Int. Cl. ..................B29h 3/00, B29h 31/00
[58] Field of Search......264/101, 102, 125, 126, 325, 264/112

[56] References Cited

UNITED STATES PATENTS

| 3,526,688 | 9/1970 | Shelton et al.........................264/102 |
| 3,048,537 | 8/1962 | Pall....................................264/126 X |
| 3,059,275 | 10/1962 | Vogt..................................264/126 X |
| 3,021,567 | 2/1962 | Ranalli..............................264/126 |

Primary Examiner—Robert F. White
Assistant Examiner—Richard R. Kucia
Attorney—Thomas B. McCulloch, Melvin F. Fincke, John S. Schneider, Sylvester W. Brock, Jr. and Chason and Sinnock

[57] ABSTRACT

Polymeric material such as solid particulate polymers as illustrated by butyl rubber, Vistanex, polyolefins such as polyethylene and polypropylene, and the like which contain residual moisture and/or gasiform material are baled and simultaneously encapsulated or wrapped in a baling zone, the interior wall of which is heated, and depending on the material being baled, subsequent to coating the wall with a polyolefin while applying mechanical pressure and reduced pressure to remove the moisture and/or gasiform material to form the bale.

11 Claims, 3 Drawing Figures

INVENTORS.
MARCUS H. SHELTON,
RALPH JAMES, JR.,

ATTORNEY.

WRAPPING OF BALED POLYMERS

BACKGROUND OF THE INVENTION

1. Field of the Invention

The present invention is directed to baling of polymeric material, particularly in a particulate form. More particularly, the invention is concerned with the baling of particulate synthetic elastomers such as butyl rubber, polyisobutylene, and the like, as well as solid polyolefins such as but not limited to polyethylene, polypropylene, and the like. In its more specific aspects, the invention is concerned with baling particulate polymeric material while encapsulating the polymeric material as it is baled.

2. Description of the Prior Art

It is known to bale material and synthetic rubber by subjecting a body of rubber particles or crumbs to mechanical pressure. It is also known to bale butyl rubber particles or crumbs and the like by application of relatively high mechanical pressure under certain conditions. It is also known that butyl rubber and the like may be baled by using relatively low pressures since application of the higher pressures was necessary to produce a bale which could be shipped without deformation until it was discovered that relatively low pressures may be used as the confined body of the particulate elastomer was subjected to reduced pressure which removes moisture, volatiles, and occluded gases such as air. Once these materials, which are compressible, were removed they were not included in the bale and on release of pressure the bale did not deform as it heretofore had, rupturing the bale and sometimes the container in which the bale was shipped.

In the prior art, after the bale was formed, it was common practice to encapsulate the bale in a film of a polyolefin such as polyethylene which heretofore was conducted in a separate step. It was also common practice to coat the bale with a powder such as zinc stearate and the like to prevent sticking; however, the use of a film of polyolefin such as polyethylene required a separate step and machinery to complete the wrapping operation before the bale was packaged for shipping.

In accordance with the present invention, unobvious results are obtained by baling particulate polymeric material such as elastomers and polyolefins by applying low mechanical pressure under reduced pressure to remove gases and the like while wrapping or encapsulating the bale during its formation. The present invention, therefore, allows the obtaining of unobvious results.

The following listed U.S. patents were considered with reference to this invention:

U.S. Pat. No. 2,324,995
U.S. Pat. No. 3,023,513
U.S. Pat. No. 3,067,462
U.S. Pat. No. 3,098,695
U.S. Pat. No. 3,264,387
U.S. Pat. No. 3,321,889
U.S. Pat. No. 3,377,553
U.S. Pat. No. 3,461,641

SUMMARY OF THE INVENTION

The present invention may be briefly described and summarized as involving the baling of polymeric material particularly in a particulate form. The polymeric material may suitably be butyl rubber particles or crumbs and the like containing occluded or entrained volatile and gasiform material such as moisture, hydrocarbons, hydrocarbon derivatives, air, gases and the like. The body of the particulate material is subjected to a reduced pressure to remove the volatile and gasiform material while applying mechanical pressure within the range from about 60 to about 300 pounds for a sufficient length of time to form a compressed high density bale, a feature of the invention being subjecting the outer edges of the body to heat while compressing the body to form the bale. The wall of the baling zone in which the body is formed may be suitably coated with a polyolefin before introduction of the particulate material and the wall heated to a temperature above the melting point of the polyolefin such that as the bale is formed as it is encapsulated in the polyolefin.

VARIABLES OF THE INVENTION

The inner wall of the baling zone may be heated to a temperature within the range of about 180° to about 350° F. usually to about 290°F. to about 240°F. to volatilize the solvent or suspending fluid and to melt the polyolefin. If the bale is a polyolefin, the outer edges are heated sufficiently to melt same and form a film encapsulating the bale. Of course, the temperature of the inner wall may be adjusted to compensate for the boiling point of any residual solvent in the particulate material, but usually will be in the range given.

The polymeric material is suitably polyolefin such as solid polyethylene, solid polypropylene, polyisobutylene known to the trade as Vistanex, butyl rubber, and the like.

The mechanical pressure applied for polyolefin powder may range from about 50 to about 500 psig. For polyolefin pellets, the mechanical pressure may be from about 100 to about 1000 psig while for butyl rubber the mechanical pressure may range from about 50 to about 250.

The mechanical pressure may be applied or held (dwell time) from about 5 to about 30 seconds. For butyl rubber the dwell time may range from about 3 to about 20 seconds while for polyolefins it may range from about 3 to about 20 seconds.

The reduced pressure may be within the range of from about 0.5 to 29 inches Hg. A suitable pressure may be from about 3 to about 20 inches Hg. for butyl rubber and from about 0.5 to about 29 inches for polyolefin.

The baling of particulate polymers and/or elastomers is accomplished, as described, provided that baling pressure, top to bottom, is sufficient to distort the baler charge significantly in the top to bottom dimension and bond the particles partially together. When this top to bottom pressure is released, the subsequent elastic response in the baled particles causes the bale to increase in height and to decrease in horizontal dimension by a similar amount. This horizontal shrinkage allows the bale to detach itself from the cavity walls without substantial distortion of the fused coating and/or the bale. The application of known release promoting compounds is indicated to further aid in this process of releasing the bale from the cavity part. The required degree of vacuum is inversely related to the elasticity of the material to be baled.

BRIEF DESCRIPTION OF THE DRAWING

The present invention will be further described and illustrated by reference to the drawing in which.

DESCRIPTION OF THE PREFERRED MODE AND EMBODIMENTS WITH RESPECT TO THE DRAWING

Figure 1:
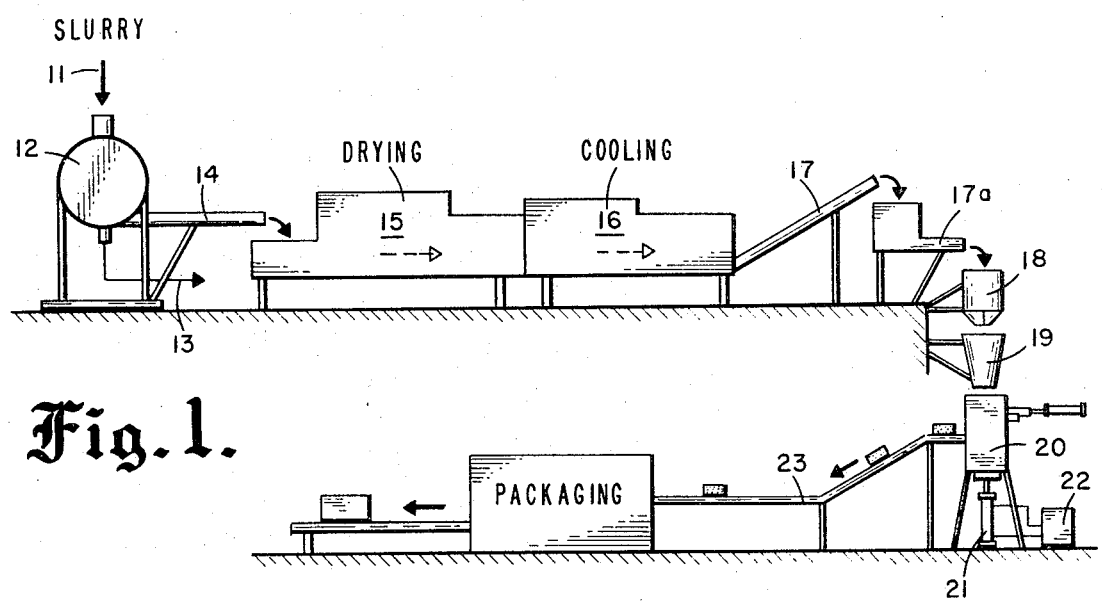
FIG. 1 is a flow diagram of a preferred mode of conducting the invention.

Referring now to the drawing and particularly to FIG. 1, numeral 11 designates a discharge line from the slurry tanks of a butyl rubber operation by way of which the aqueous slurry of butyl rubber is introduced into filtering means such as Oliver type filters 12. In the filter 12, the aqueous fluid is substantially removed and discharged by line 13, while the filtered butyl rubber particles or crumbs are introduced into a screw conveyor 14 whereby the filtered crumbs are introduced into a drying system such as a drying train 15 provided with suitable heating facilities to raise the temperature of the crumbs to a temperature in the range from about 100°F. to about 300°F. sufficient to remove substantially all of the water from the crumbs or butyl rubber particles. For example, the crumbs or particles in conveyor 14 may have a water content ranging from about 20 to about 30 percent by weight; whereas, in the drying train 15 the water content is reduced to about 0.001 to about 5.0 percent by weight. A portion of the drying train 15 is suitably provided with means for cooling the heated crumbs, or suitably a section such as 16 of the drying train 15 may omit the heating facilities such that the temperature of the dried butyl rubber particles or crumbs may be controlled. From the section 16 of the drying train 15, the dried particles or butyl rubber crumbs are discharged at a temperature within the range from about 160° to about 180°F. and introduced by a screw conveyor 17 via a feeder 17A onto scales 18 where the crumbs are suitably weighed prior to discharging by hopper means 19 into a baler 20, which is described in more detail with respect to FIG. 2. The baler 20 is provided with a hydraulic mechanism, including a piston and cylinder 21, operated by a suitable source of hydraulic fluid 22. The bales of butyl rubber are discharged from the baler 20 onto a conveyor 23 from whence the bales are discharged.

Figure 2:
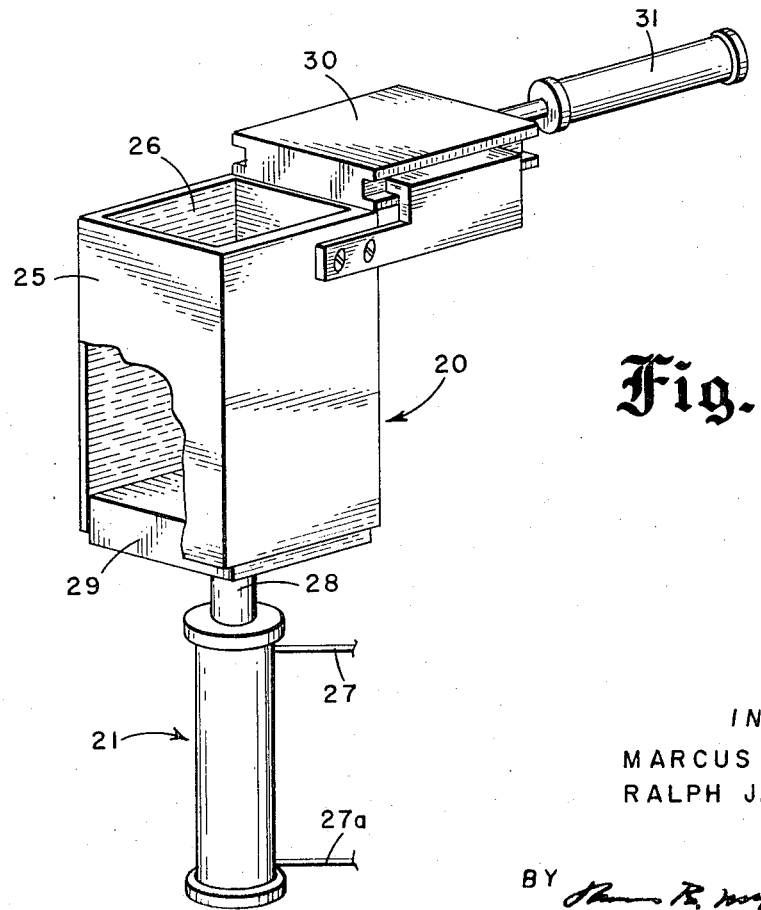
FIG. 2 is an isometric view of one type of baler such as is employed in FIG. 1.

Referring now to FIG. 2, the baler, generally indicated by numeral 20, in comprised of a rectangular shape member 25 defining a cavity 26 into which the particles of butyl rubber are discharged from the hopper means 19. The piston and cylinder arrangement 21 is provided with hydraulic fluid lines 27 and 27a for introduction and withdrawal of hydraulic fluid. The hydraulic mechanism 21 carries a ram 28 which actuates a block 29 having a size and shape such that it is movable vertically within the cavity 26. The upper end of the baler 20 is closed by a suitable block 30 which is movable laterally by a moving mechanism 31 which also may be hydraulically operated. As the butyl rubber particles are introduced into the top of the cavity 26, the block 30 is moved laterally to close the top of the cavity, and then pressure is exerted by the hydraulic mechanism to raise the block 29 into the cavity 26 to apply mechanical pressure thereto to form the bales under the temperature and pressure conditions and time of contact or dwell time given. Under these conditions, a bale having a density suitable for shipment is formed. The block 30 is withdrawn laterally and the block 29 is raised to discharge the bale out of the upper end. The block 30 then is again moved laterally to shove the bale onto the conveyor 23.

It is to be understood that the baler 20 of FIGS. 1 and 2 may be suitably equipped with means for spraying the inner surface thereof including the block 29 and block 30. Furthermore, it will be understood that the baler 20 includes provisions for heating the inner surface of the outer periphery of cavity 26 and also for reducing pressure in the cavity 36.

Figure 3:
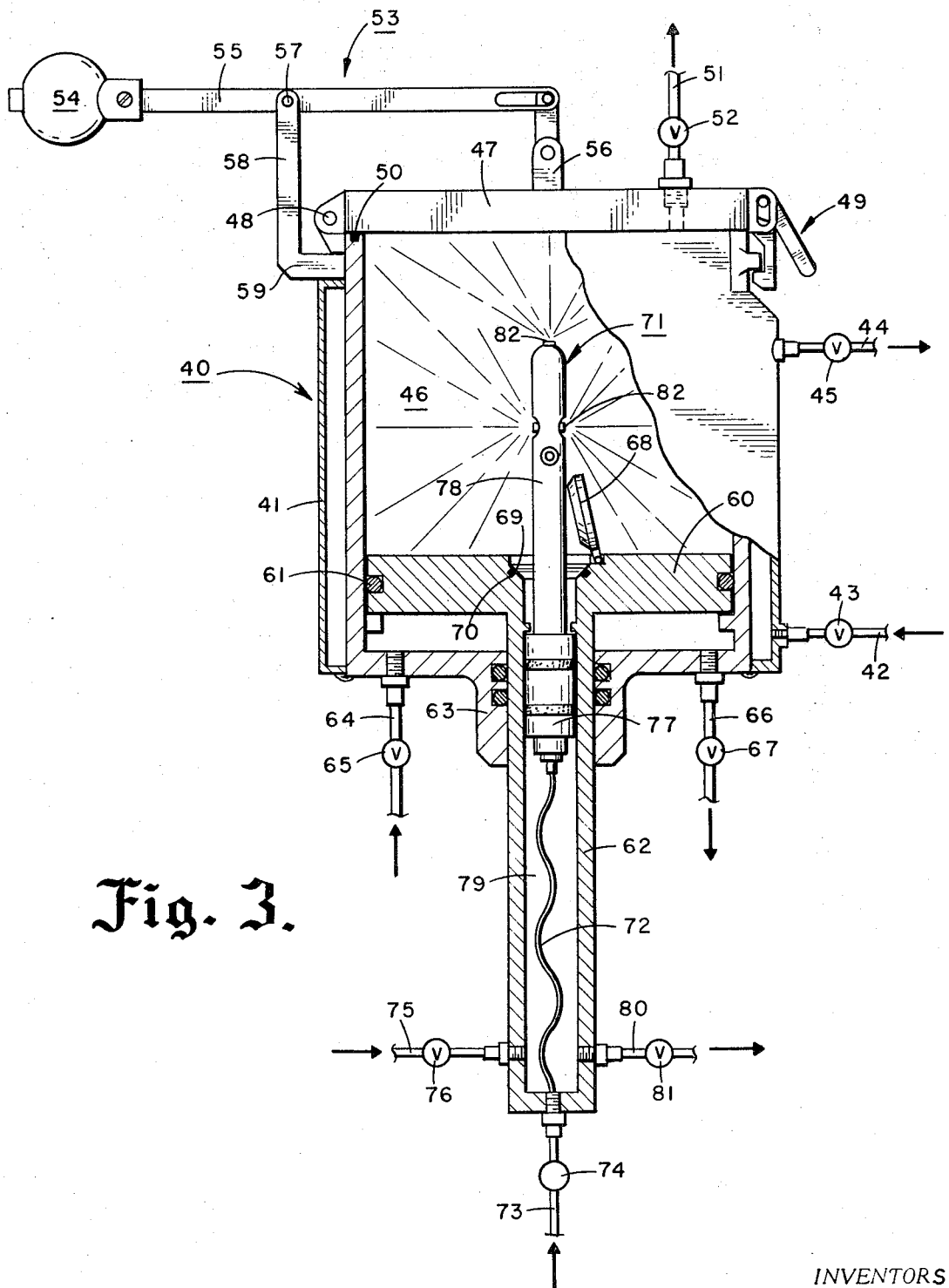
FIG. 3 is a sectional view of a baling zone with provision for coating the interior wall of the baling zone and for heating the wall.

Referring now to FIG. 3 in which a sectional view of a baling zone 40 is shown, the baling zone 40 is provided with a heating jacket 41 into which a conduit 42 controlled by valve 43 leads via which a heating fluid may be introduced. A conduit 44 controlled by valve 45 provides for circulation of the heating fluid. The heating fluid is introduced through line 42 and circulates through the jacket 41 and out through line 44. The heating fluid is at a sufficient temperature to raise the internal wall of cavity 46 to a temperature within the range of about 200° to about 350°F., if the baled material is to be merely fused, as in baling polyolefins. If the bale is to be an elastomer wrapped in a polyolefin jacket, the wall temperature is above the melt point of the polyolefin.

The baling zone 40 has a top cover 47 which is hingedly connected by pivot 48 to the zone 40 and latched thereto by latch 49 provided with a seal 50. The top cover 47 has a conduit 51 controlled by valve 52 for reducing the pressure in the cavity 46 and thereby removing occluded and/or entrained gasiform material from the cavity 46 and the particulate polymeric material.

The cover 47 is hingedly connected by a counter weight means 53 including a counter weight 54 and an arm 55 connected to upstanding member 46. The arm 55 is pivotally connected by pin 57 to a bracket member 58 which is connected by member 59 to the baling zone 40.

Arranged in the cavity 46 is a block or piston member 60 provided with a sealing means 61 which seals with the inner wall of baling zone 40, the block or piston 60 being connected to a member 62 which is arranged in stuffing box means 63 for movement in a vertical direction as air pressure is introduced into the cavity 46 below the piston 60 by conduit 64 controlled by valve 65. Pressure is released from the cavity 46 by conduit 66 controlled by valve 67 which allows the piston or block 60 to move downwardly. The block or piston 60 is provided with a hinged valve 68 designed to seat on a seat 69 on the block or piston 60 and seal with seal 70.

When it is desired to coat the interior wall of zone 40 an elongated member 71 connected by flexible pressure hose 72 to a conduit 73 controlled by valve 74 is raised through valve 68 by pressure applied through conduit 75 controlled by valve 76 against piston 77 attached to an elongated perforated member 78. Pressure is released from the cavity 79 below the piston 77 by conduit 80 controlled by valve 81.

The upper end of the elongated member 78 is provided with numerous perforations or nozzles designated as 82 through which a spray or jets of a polyolefin suspension or solution may be sprayed against the surface of the cavity 46. The solution or suspension may also contain a suitable powder such as to prevent sticking if there is any tendency of such. Thus, the inner surface of the cover 47, the walls of the baling zone 40 and the upper surface of the block or piston 60 may be suitably sprayed with a polyolefin suspension. For example, the spray may comprise polyethylene powder, polyethylene powder and talc, or talc, in a solvent containing silicone oils, and the like.

The operation of the present invention, particularly with respect to FIG. 3 is as follows:

It is assumed that the cavity 46 has been freed of a bale of solid polymeric material as shown in FIGS. 1 and 2. When this happens, the cover 47 is swung back into place and latched and sealed to form a pressure tight cavity 46. The spray head 82 is raised by introduction of pressure under the piston 77 and polyolefin suspension is then fed through the conduit 73, the hose 72, and the elongated member 71 into the cavity 46 to thoroughly coat the exposed surfaces of the cavity 46.

Pressure is then released by opening valve 81 which allows the member 78 to drop downwardly allowing valve 68 which is spring loaded to close and seat and seal on the seat 69. The cover 47 is then opened and a load of the particulate polymeric material is dropped into the cavity 46 on to the block or piston 60 in its lowered position as illustrated.

As fluid pressure, such as air and the like is introduced by conduit 64, heating fluid is circulated through the jacket 41 causing the inner wall of cavity 46 to be heated; sufficient heat also being transmitted to the inner surface of cover 47 and the upper surface of piston 60. A sufficient amount of heat is applied to raise the outer periphery of cavity 46 to a temperature above the melting point of the polyolefin introduced by spray head 82 and to melt same. At the same time reduced pressure is being applied through the conduit 51 by opening valve 52 to remove gasiform materials while the piston 60 is being raised by introduction of fluid pressure such as air and the like to provide sufficient mechanical pressure to form the bale. The temperature of the periphery of cavity 46 is sufficient to volatilize the carrier or solvent for the suspension or solution which may be methyl chloride when butyl rubber is being baled and iso and normal paraffins, cycloparaffins, naphthenes, aromatics and the like boiling from about 100° to about 750°F. when polyolefins are being baled. Ordinarily the high boiling solvents will not be used but solvents will be used boiling within the range given and volatilizable at the reduced pressure and at the temperature of the baler, and to melt the polyolefin to wrap or encapsulate the bale as it is being formed such that when the bale is ejected as shown in FIGS. 1 and 2 it is already wrapped and ready for packaging.

Thus, the present invention allows the obtaining of unobvious results in forming a bale and encapsulating or wrapping it in one operation entirely eliminating expensive and time consuming steps and equipment. Thus, the present invention is quite unobvious and useful.

The butyl rubber which is baled in accordance with the present invention is manufactured by techniques well known in the art. Briefly, butyl rubber is a copolymer of diolefin and a tertiary mono-olefin. For example, isoprene or butadiene and isobutylene are reacted at a temperature in the range from about −40° F. to about −160°F. in the presence of a Friedel-Crafts catalyst such as aluminum chloride. The catalyst system is ordinarily aluminum chloride in methyl chloride and the mixture of isoprene and isobutylene, for example, contacts the catalytic solution in a tubular type of reactor at low temperature conditions to form a slurry of butyl rubber particles in solution in a diluent which may also be methyl chloride. The slurry is then introduced into water to form a slurry of butyl rubber, generally in the form of crumbs, in the water. The water is then removed from the slurry and the crumbs or particles of butyl rubber are recovered in accordance with the present invention. A description of a method for producing butyl rubber may be found in U.S. Pat. No. 2,474,592.

The polyolefin employed in the present invention may be produced by contacting an olefin such as polypropylene with a catalyst such as $TiCl_3 \cdot 1/3$ aluminum chloride at a temperature within the range of about 32°F. to about 350°F. The manufacture of polypropylene is well known and is described in U.S. Pat. No. 3,032,510.

The Polyethylene employed in the present invention may be either low density polyethylene produced by high pressure polymerization of ethylene in the presence of oxygen yielding catalyst or high density polyethylene which may be produced by contact with a catalyst such as a Ziegler catalyst at a temperature of about 32° to about 250°F. such as described in the Ziegler patents. Both low and high density polyethylene may be baled in accordance with the present invention. High density polyethylene may be produced similarly to the production of polypropylene.

While the present invention has been described and illustrated with respect to specific equipment and materials, it is understood that it is applicable to other polymeric material which is susceptible to baling and which is wrapped in a film which may be melted.

The nature and objects of the present invention having been completely described and illustrated and the best mode contemplated set forth what we wish to claim as new and useful and secure by Letters Patent is:

1. A method of encapsulating compressible solid elastomeric material which comprises:
    applying a coating of polyolefin to the interior wall of a baling zone;
    forming a body of said solid material in said baling zone; and
    in one operation applying mechanical pressure within the range of 60 to 300 psig to said body for a time from about 3 to about 30 seconds under reduced pressure within the range of 0.5 to 29 inches Hg absolute in said zone while applying heat only to the outer edges of said body sufficient to raise the temperature of said polyolefin above its melting point and form a film of said polyolefin encapsulating said body as said body is reduced in volume and increased in density.

2. A method in accordance with claim 1 in which the solid elastomeric material is butyl rubber.

3. A method in accordance with claim 1 in which the solid elastomeric material is particulate.

4. A method in accordance with claim 1 in which the polyolefin powder comprises polyethylene powder.

5. A method in accordance with claim 1 in which the polyolefin powder comprises polypropylene powder.

6. A method in accordance with claim 1 in which the elastomeric material is polyisobutylene.

7. A method in accordance with claim 1 in which the polyolefin is a suspension.

8. A method in accordance with claim 1 in which the interior wall of the baling zone is coated with a suspension of polyethylene powder and talc.

9. A method in accordance with claim 1 in which the interior wall of the baling zone is coated with a polyethylene solution containing talc and silicone oil.

10. A method in accordance with claim 1 in which the elastomer is an olefinic copolymer.

11. A method in accordance with claim 1 in which the elastomeric material is olefinic.

* * * * *